(12) United States Patent
Morreale et al.

(10) Patent No.: US 10,900,365 B2
(45) Date of Patent: Jan. 26, 2021

(54) ASSEMBLY FORMING A GASKET FOR A TURBOMACHINE, COMPRISING A BRUSH SEAL

(71) Applicant: SNECMA, Paris (FR)

(72) Inventors: Serge Rene Morreale, Guignes (FR); Francois Jean Comin, Melun (FR); Arnaud Jean-Marie Pierrot, Le Mee sur Seine (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 239 days.

(21) Appl. No.: 15/923,968

(22) Filed: Mar. 16, 2018

(65) Prior Publication Data

US 2018/0202303 A1    Jul. 19, 2018

Related U.S. Application Data

(63) Continuation of application No. 14/646,872, filed as application No. PCT/FR2013/052878 on Nov. 27, 2013, now abandoned.

(30) Foreign Application Priority Data

Nov. 29, 2012 (FR) .................... 12 61405

(51) Int. Cl.
   *F16J 15/3288* (2016.01)
   *F01D 11/00* (2006.01)
   *B23P 19/04* (2006.01)
   *F16J 15/3268* (2016.01)

(52) U.S. Cl.
   CPC .......... *F01D 11/001* (2013.01); *B23P 19/04* (2013.01); *F01D 11/003* (2013.01); *F16J 15/3268* (2013.01); *F16J 15/3288* (2013.01); *F05D 2240/56* (2013.01)

(58) Field of Classification Search
   CPC ................................... F16J 15/3288
   USPC ........................................ 277/355
   See application file for complete search history.

(56) References Cited

U.S. PATENT DOCUMENTS

| 4,781,388 | A |   | 11/1988 | Woehrl |
| 5,066,024 | A | * | 11/1991 | Reisinger ........... A46D 3/05 277/355 |
| 5,176,389 | A | * | 1/1993 | Noone ............ F16J 15/3288 277/355 |
| 5,474,305 | A | * | 12/1995 | Flower ............ F16J 15/3288 277/355 |

(Continued)

OTHER PUBLICATIONS

French Search Report dated Feb. 26, 2013 in French Patent Application No. 1261405 Filed Nov. 29, 2012.

(Continued)

*Primary Examiner* — Kristina R Fulton
*Assistant Examiner* — L. Susmitha Koneru
(74) *Attorney, Agent, or Firm* — Oblon, McClelland, Maier & Neustadt, L.L.P.

(57) ABSTRACT

An assembly forming a gasket for a turbomachine, includes a brush seal made of a plurality of sealing elastic bristles surrounding a core, a retaining ring including a recess to at least partly accommodate the brush seal, and a bearing cover, placed in contact with the brush seal to hold it in position against the retaining ring, the brush seal being located between the retaining ring and the bearing cover.

18 Claims, 4 Drawing Sheets

(56) References Cited

U.S. PATENT DOCUMENTS

| | | | |
|---|---|---|---|
| 5,480,162 A | 1/1996 | Beeman | |
| 6,161,836 A * | 12/2000 | Zhou | F16J 15/3288 |
| | | | 277/355 |
| 6,170,831 B1 | 1/2001 | Bouchard | |
| 6,286,211 B1 * | 9/2001 | Turnquist | B23H 9/00 |
| | | | 277/347 |
| 6,293,553 B1 * | 9/2001 | Werner | F01D 11/001 |
| | | | 277/355 |
| 6,302,400 B1 | 10/2001 | Werner | |
| 8,312,702 B2 | 11/2012 | Bart | |
| 2002/0020968 A1 * | 2/2002 | Gail | F16J 15/3288 |
| | | | 277/355 |
| 2004/0119237 A1 * | 6/2004 | Datta | F16J 15/3288 |
| | | | 277/355 |
| 2005/0040602 A1 * | 2/2005 | Beichl | H01R 39/50 |
| | | | 277/355 |
| 2005/0116423 A1 * | 6/2005 | Beichl | F16J 15/3288 |
| | | | 277/355 |
| 2005/0151324 A1 * | 7/2005 | Plona | F01D 11/003 |
| | | | 277/355 |
| 2008/0148640 A1 * | 6/2008 | Marron | A46B 5/06 |
| | | | 49/355 |
| 2008/0309017 A1 * | 12/2008 | Mattice | H02G 3/22 |
| | | | 277/355 |
| 2009/0001668 A1 * | 1/2009 | Plona | F01D 11/001 |
| | | | 277/355 |
| 2009/0072486 A1 * | 3/2009 | Datta | F16J 15/3288 |
| | | | 277/355 |
| 2010/0327536 A1 | 12/2010 | Beichl | |
| 2011/0018204 A1 | 1/2011 | Beichl | |
| 2011/0049810 A1 * | 3/2011 | Ferryman | F28D 19/047 |
| | | | 277/355 |
| 2013/0175761 A1 * | 7/2013 | Ferryman | F16J 15/3288 |
| | | | 277/355 |
| 2013/0277918 A1 * | 10/2013 | Fitzgerald | F01D 11/00 |
| | | | 277/355 |
| 2015/0097342 A1 | 4/2015 | Morreale | |
| 2015/0377049 A1 * | 12/2015 | Weber | F01D 11/001 |
| | | | 415/173.7 |

OTHER PUBLICATIONS

International Search Report dated Mar. 18, 2014 in PCT/FR2013/052878 Filed Nov. 27, 2013.

* cited by examiner

ASSEMBLY FORMING A GASKET FOR A TURBOMACHINE, COMPRISING A BRUSH SEAL

CROSS-REFERENCE TO RELATED APPLICATIONS

This application is a continuation of U.S. application Ser. No. 14/646,872 filed May 22, 2015, the entire contents of which is incorporated herein by reference. U.S. application Ser. No. 14/646,872 is a 371 of International Application No. PCT/FR2013/052878 filed Nov. 27, 2013 and claims the benefit of priority from prior French Application No. 12 61405 filed Nov. 29, 2012.

TECHNICAL FIELD

The present invention relates to the field of turbomachines, and more particularly to the general field of sealing devices intended to reduce the flow areas between various cavities of a turbomachine. It more specifically relates to an assembly forming a gasket, a stator part and a turbomachine comprising such an assembly as well as an associated assembling method.

The invention applies to any type of land or air turbomachines, and in particular to aircraft turbomachines such as turbojets and turboprops. More preferentially, the invention can apply to a twin-spool turbofan.

STATE OF THE PRIOR ART

In the field of turbomachines, there are different types of sealing systems to provide sealing at the hot sections of turbomachines.

We know, for example from the patents U.S. Pat. Nos. 4,781,388, 5,480,162 and 6,170,831, the seals called brush seals, which are made of a plurality of bristles or threads, for example of carbon, which are crimped or welded and held in a housing at one of the ends thereof and which are in contact, at their free ends, with the surface of the part to be sealed of the turbomachine. Such brush seals can adapt to the clearance variations that the sealing devices experience. Indeed, the bristles of a brush seal can structurally adapt to the deformed or discontinuous surfaces of the part to be sealed.

The patent applications US 2010/0327536 and US 2011/0018204 further describe other exemplary brush seals on which the structural parts of the machine are bearing.

By way of example, FIG. 1 shows in a transverse cross-section on the left side part and in a front view on the right side part, such an exemplary brush seal 1, fitted with carbon bristles 4 (also referred to as "carbon brush seal"). The carbon brush seal 1 comprises a toroidal core 2 in a toroidal area 3 of the carbon brush seal 1, and a skirt 5 extending around the toroidal core 2 and the carbon bristles 4. The bristles 4 are enclosed in a strip 6 having a low thickness, in the order of 0.1 to 0.3 mm. Besides, the toroidal area 3 can be formed integrally using the skirt 5 or in several parts using a lid 7 covering the skirt 5, possibly discontinuous, as illustrated in FIGS. 2A and 2B respectively.

The present methods for manufacturing and assembling such a carbon brush seal 1 on the turbomachine are not totally satisfactory. Indeed, manufacturing and assembling the brush seal can lead to considerable geometrical defects, in particular run outs and eccentricity faults, which do not enable a proper operation of the brush seal to be provided and therefore a correct sealing to be achieved.

Particularly, the obtained carbon brush seal 1 is much too flexible to enable a proper concentricity to be provided in particular between the inner diameter of the skirt 5 and the inner diameter of the bristles 4, between the outer diameter of the brush seal 1 and the inner diameter of the skirt 5, and between the outer diameter of the brush seal 1 and the inner diameter of the bristles 4. Moreover, the brush seal 1 generally becomes "out-of-round" (called a "run out") in proportions often unacceptable.

During the assembly on the turbomachine 10, the brush seal 1 is introduced into a bore 8, then crushed by means of a compression plate 9, engaged to the stator through a fixing element 11, by applying a force intended to prevent the brush seal 1 from rotating, as schematically illustrated in FIG. 3.

Permeability and wear resistance of the brush seal 1 essentially depend on the proper control of geometrical parameters such as the interference area 12 between the bristles 4 and the track 13 of the part to be sealed, and the contact area 14 between the back ring 15 of the compression plate 9 and the skirt 5. But, the defects of the brush seal 1, already considerable before assembling, are increased by the deformation thereof, after assembling. This results in an interference between the bristles 4 and the track 13, and a clearance J of the back ring 15 with the skirt 5, which are not properly controlled and do not enable the brush seal 1 to provide a proper sealing.

More precisely, in a normal configuration as illustrated in FIG. 4A, the back ring 15 of the compression plate 9 is contacting the skirt 5 of the brush seal 1. The clearance J between the ring 15 and the outer diameter of the track 13 may enable the permeability of the brush seal 1 to be adjusted by allowing a more or less considerable deflection of the bristles 4 under air pressure. But in an abnormal configuration as illustrated in FIG. 4B, in the presence of geometrical defects of the brush seal 1, the run out and the concentricity faults are such that the clearance J in the contact area 14 is sometimes carried out by the back ring 15 (normal case of FIG. 4A) but sometimes also by the skirt 5 according to the considered angle (abnormal case of the FIG. 4B). The clearance J in the contact area 14 is therefore not only permanently adjusted by the back ring 15, due to the manufacturing and assembling defects of the brush seal 1, which come from an excessive flexibility in the seal.

Thus, the geometrical defects of the brush seal induced by the present manufacturing and assembling methods can lead to a poor control of the permeability and to a premature wear of the bristles. Moreover, since assembling the seal can result in a plastic deformation thereof, a removal on account of a faulty assembling may be necessary in order to totally replace the brush seal even before it ever functioned.

DISCLOSURE OF THE INVENTION

The object of the invention is thus to at least partially overcome the abovementioned requirements and the drawbacks related to the prior art embodiments.

The aim of the invention is particularly to provide a solution to design an assembly forming a gasket which would be solid enough to prevent or at least reduce the appearance of geometrical defects during the manufacturing or assembling thereof on a turbomachine.

The object of the invention is thus, according to one of its aspects, an assembly forming a gasket for a turbomachine, characterized in that it comprises:

a brush seal made of a plurality of sealing elastic bristles surrounding a core, a retaining ring comprising a recess to at least partially accommodate the brush seal, and a bearing cover, placed in contact with the brush seal to hold it in position against the retaining ring, the brush seal being located between the retaining ring and the bearing cover.

Advantageously, the assembly forming a gasket according to the invention can be assembled and disassembled on the turbomachine, so as not to make up an integral part of the turbomachine.

Thanks to the invention, the assembly forming a gasket can make up a solid enough piece to enable a proper operation of the brush seal to be provided, in particular by avoiding the prior art drawbacks related to the usual geometrical defects of the brush seal. Moreover, the assembly of the brush seal on the turbomachine is also simplified since the assembly forming a gasket can be placed against a support of a stator part for example, without having to exert a pressure. The assembly forming a gasket, and therefore the brush seal, can moreover be disassembled and reassembled as many times as necessary without risking plastic deformations of the brush seal, unlike the prior art solutions practicing a systematic compression of the brush seal during the assembly and reassembly.

The assembly forming a gasket according to the invention can further comprise one or several of the following features, taken individually or according to any possible technical combinations.

The retaining ring can be chosen so as to be rigid, in particular to be more rigid than the brush seal. By "rigid", it should be understood that the retaining ring does not substantially deform during its positioning on the turbomachine, in particular during its fixing to a support element of a turbomachine stator part. The rigidity of the retaining ring can thus be enough to prevent or at least reduce the appearance of the prior art geometrical defects. Particularly, the rigidity of the retaining ring can enable the excessive flexibility of the brush seal in the prior art solution to be overcome.

The recess of the retaining ring can have a substantially cylindrical shape to fit closely the shape of the toroidal area of the brush seal, at least partially accommodated in the recess, and to hold the brush seal in position. This way, the rotation of the brush seal can be avoided.

The bearing cover can comprise a first planar bearing portion, placed in contact with the bristles of the brush seal outside the toroidal area.

Furthermore, the bearing cover can comprise a second bearing portion, placed in contact with the bristles of the brush seal at the toroidal area and having a substantially cylindrical shape to fit closely the shape of the toroidal area.

The mutual cooperation between the bearing cover and the retaining ring may enable the brush seal to be held in position and the rotation thereof to be avoided, without impacting the geometrical properties thereof. In particular, it may thus be possible to prevent run out or concentricity faults from appearing, which can generally be caused by the crushing of the excessively flexible brush seal.

The bearing cover can be fixed to the retaining ring by welding or crimping. During a fixing by crimping in particular, the bearing cover can comprise a second bearing portion having a substantially cylindrical shape to fit closely the shape of the toroidal area.

The retaining ring can comprise a fixing leg to enable the retaining ring to be fixed to a support element of a turbomachine stator part. The fixing leg can make up an extension of the retaining ring from a portion of the retaining ring in contact with the brush seal.

A further object of the invention, according to another of its aspects, is a turbomachine stator part, characterized in that it comprises an assembly forming a gasket such as previously defined and a support element on which the retaining ring of the assembly forming a gasket is fixed.

The support element can have a substantially complementary shape to that of the retaining ring.

The stator part can comprise at least two assemblies forming a gasket associated to at least two support elements.

The stator part can comprise an elastic return member, in particular a "daisy wheel"-type spring, placed between the support element and the bearing cover of the assembly forming a gasket to intensify the contact between the bristles of the brush seal and the retaining ring.

The assembly forming a gasket and the support element can define a housing therebetween, in which the elastic return member is located.

The elastic return member can bear both on the support element and on the bearing cover of the assembly forming a gasket. The elastic return member can be fixed or not, for example by welding or crimping, to the support element and/or the bearing cover of the assembly forming a gasket.

Yet a further object of the invention, according to another of its aspects, is a turbomachine characterized in that it comprises an assembly forming a gasket such as previously defined or a turbomachine stator part such as previously defined.

Yet a further object of the invention, according to another of its aspects, is a method for assembling an assembly forming a gasket such as previously defined on a turbomachine stator part, characterized in that it comprises the only step of fixing the retaining ring of the assembly forming a gasket to a support element of the stator part.

The method according to the invention can thus enable the desired sealing to be provided by using a brush seal in the turbomachine only by integrating an assembly forming a gasket without compressing the brush seal, the assembly forming a gasket being solid enough to enable the concentricity and run out tolerances to be respected with a proper operation of the brush seal.

The turbomachine stator part, the turbomachine and the assembling method according to the invention can comprise any of the previously stated features, taken individually or according to any technically possible combinations with other features.

BRIEF DESCRIPTION OF THE DRAWINGS

The invention will be better understood upon reading the following detailed description of non-limiting exemplary embodiments thereof, as well as upon examining schematic and partial figures of the accompanying drawing, on which.

In all these figures, identical references can designate identical or analogous elements.

Moreover, the various parts represented in the figures are not necessarily drawn to a uniform scale, in order to make the figures more understandable.

DETAILED DISCLOSURE OF PARTICULAR EMBODIMENTS

FIGS. 5 to 8 will be now described thereafter, since FIGS. 1 to 4B related to the prior art have been previously described.

Figure 1:
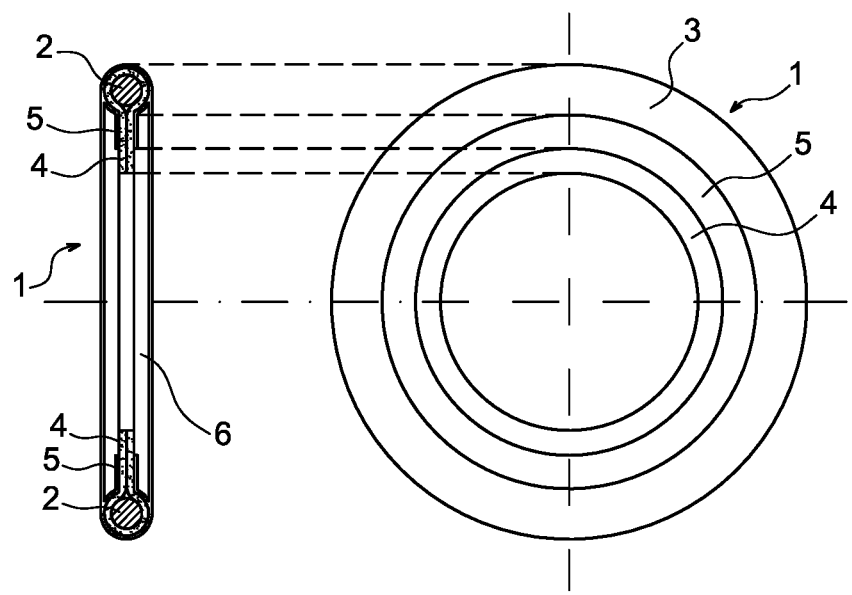
FIG. 1 represents, in transverse cross-section and in front view, an exemplary brush seal according to the prior art.
Figure 2A:
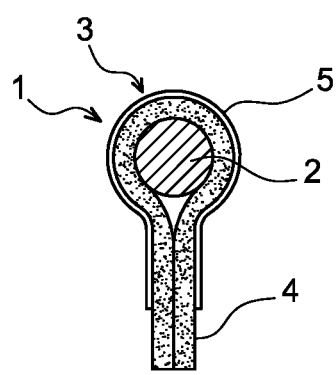
FIGS. 2A and 2B illustrate, in cross-section, two embodiments of the toroidal area of a brush seal according to the prior art.
Figure 2B:
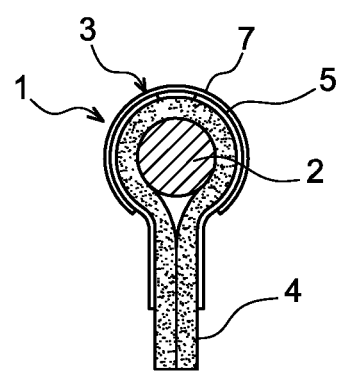
Figure 3:
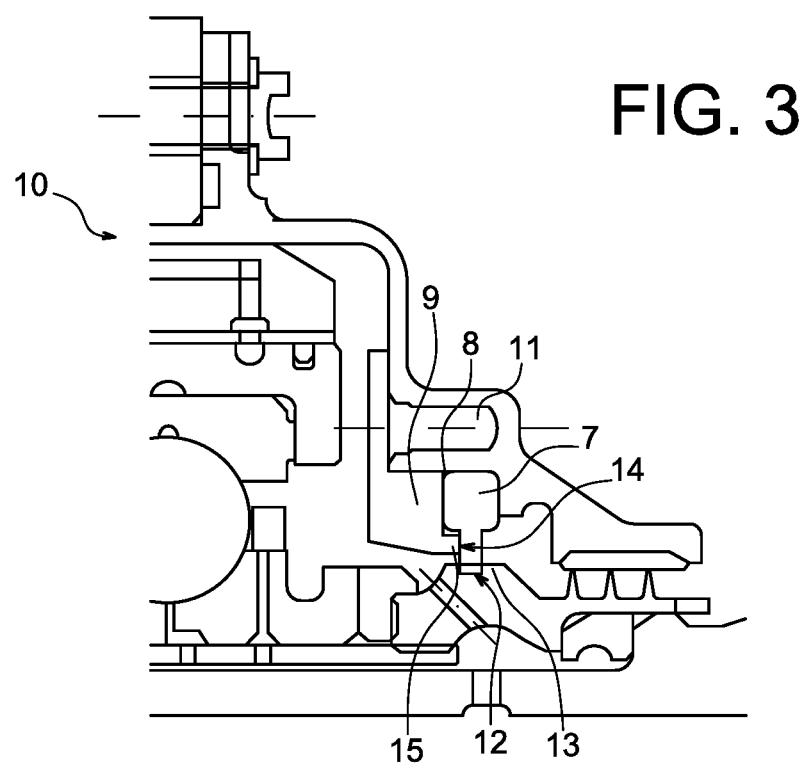
FIG. 3 illustrates, in cross-section, the introduction of a brush seal according to the prior art into a turbomachine.
Figure 4A:
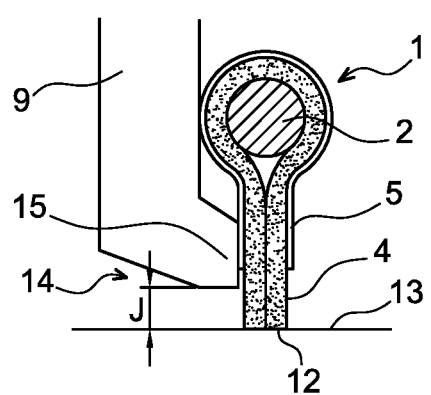
FIGS. 4A and 4B illustrate, in cross-section, the clearance of the back ring respectively in a normal and an abnormal operation case of a brush seal according to the prior art.
Figure 4B:
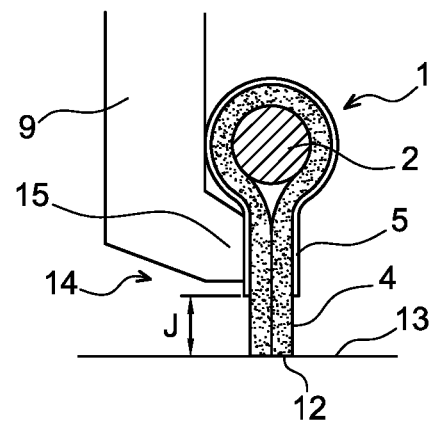
Figure 5:
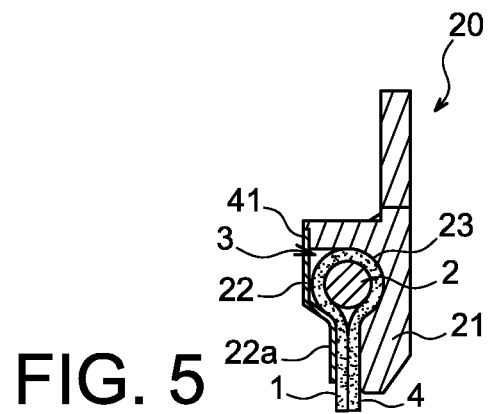
FIG. 5 represents, in cross-section, an exemplary assembly forming a gasket according to the invention.

In reference to FIG. 5, a first exemplary assembly forming a gasket 20 for a turbomachine according to the invention is represented in cross-section.

The assembly forming a gasket 20 comprises a brush seal 1 made of a plurality of bristles 4, for example of carbon, disposed around a core 2. The assembly 20 further comprises a retaining ring 21, which comprises a recess 23 to at least partly accommodate the toroidal area 3 of the brush seal 1, and a bearing cover 22, placed in contact with the brush seal 1 to hold it in position and prevent its rotation, the brush seal 1 being located between the retaining ring 21 and the bearing cover 22.

The recess 23 of the retaining ring 21 is provided to have a substantially cylindrical shape so as to fit closely the shape of the toroidal area 3 of the brush seal 1 and enable the brush seal 1 to be properly held in position.

The brush seal 1 is also held in position through the bearing cover 22, which in particular has a first substantially planar bearing portion 22a, which contacts the bristles 4 of the brush seal 1 in the part of the brush seal 1 located outside the toroidal area 3.

The retaining ring 21 further comprises a fixing leg 26, for fixing the retaining ring 21 to the support element 32 of a turbomachine stator part 30. The fixing leg 26 can for example form a substantially linear extension of the retaining ring 21 from a portion thereof in contact with the brush seal 1.

In the example of FIG. 5, the bearing cover 22 is fixed to the retaining ring 21 through a welding 41. However, it can be made differently.

Figure 7:
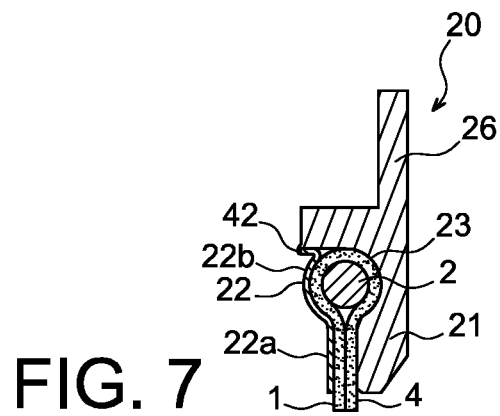
FIG. 7 represents, in cross-section, an alternative embodiment of an assembly forming a gasket conform to the invention.

By way of example, FIG. 7 represents, in cross-section, a second exemplary embodiment of an assembly forming a gasket 20 according to the invention. In this figure, the bearing cover 22 is fixed to the retaining ring 21 through a crimping 42.

Furthermore, in the example of FIG. 7, the bearing cover 22 comprises, besides a first bearing portion 22a such as previously defined, a second bearing portion 22b, placed in contact with the bristles 4 of the brush seal 1 at the toroidal area 3 and having a substantially cylindrical shape to fit closely the shape of the toroidal area 3. In this way, the brush seal 1 is further held in position.

After assembling the bearing cover 22 on the retaining ring 21, the inner diameter of the bristles 4 of the brush seal 1 can be machined so as to be adapted to the requirements in terms of sealing.

Figure 6:
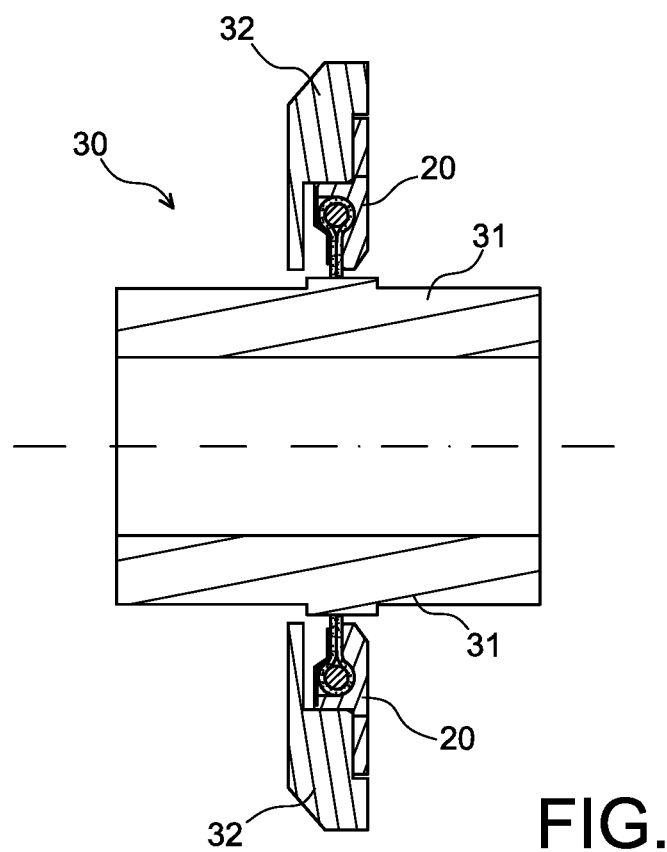
FIG. 6 illustrates, in cross-section, the integration of two assemblies forming a gasket according to FIG. 5 on a turbomachine stator part according to the invention.

FIG. 6 represents, in cross-section, an exemplary turbomachine stator part 30 comprising two assemblies forming a gasket 20, identical to the one of the example of FIG. 5.

Both assemblies forming a gasket 20 are fixed to support elements 32 of the stator part 30, in particular through fixing legs 26, such that the bristles 4 of the brush seal 1 contact the tracks of the pieces to be sealed 31 of the stator part 30.

Figure 8:
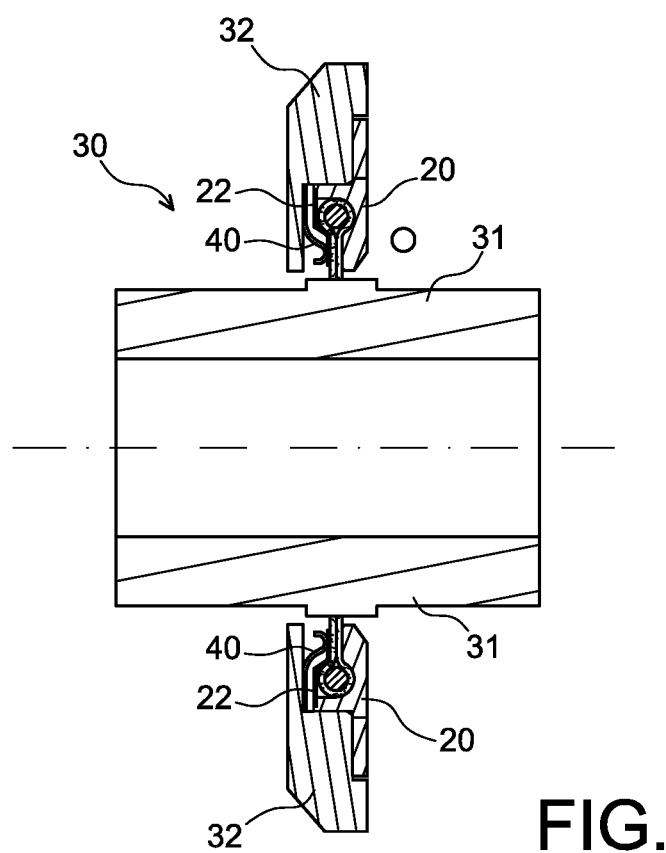
FIG. 8 illustrates, in cross-section, an alternative integration of two assemblies forming a gasket according to the invention on a turbomachine stator part.

FIG. 8 represents an alternative turbomachine stator part 30 according to the invention, comprising two assemblies forming a gasket 20 identical to that of FIG. 5.

However, in the example of FIG. 8, an elastic return member 40 is provided between a support element 32 and a bearing cover 22 of an assembly forming a gasket 20, so as to intensify the contact between the bristles 4 of the brush seal 1 and the retaining ring 21. The elastic return member 40 can for example be a "daisy wheel"-type spring.

Generally speaking, the pressure exerted by the bearing cover 22 on the bristles 4 of the brush seal 1 against the retaining ring 21, can be determined in order to prevent the brush seal 1 from rotating, and if need be, the use of an elastic return member 40 may enable this pressure to be increased.

The invention is of course not limited to the just described exemplary embodiments. Various modifications can be brought thereto by those skilled in the art.

The term "comprising a" must be understood as being a synonym of "comprising at least one", unless otherwise specified.

The invention claimed is:

1. A method of forming an assembly forming a gasket for a turbomachine, comprising:
    providing a brush seal made of a plurality of sealing elastic bristles surrounding a core, and a retaining ring comprising a recess;
    fixing the retaining ring to a support element of a turbomachine stator part;
    inserting the brush seal in the recess of the retaining ring;
    placing a bearing cover in contact with the brush seal to hold the brush seal in position against the retaining ring, the brush seal being located between the retaining ring and the bearing cover; and
    machining an inner diameter of the bristles of the brush seal, after assembling the bearing cover on the retaining ring, such that the brush seal is adapted to meet sealing requirements,
    wherein the retaining ring includes a fixing leg for fixing the retaining ring to the support element of the turbomachine stator part, the fixing leg forming a substantially linear extension of the retaining ring from a portion of the retaining ring in contact with the brush seal, a free end of the fixing leg being above an upper end of the bearing cover.

2. The method according to claim 1, wherein the recess of the retaining ring has a cylindrical shape to fit closely a shape of a toroidal area of the brush seal and to hold the brush seal in position.

3. The method according to claim 1, wherein the bearing cover comprises a first planar bearing portion, placed in contact with the bristles of the brush seal outside a toroidal area of the brush seal.

4. The method according to claim 1, wherein the bearing cover comprises a second bearing portion, placed in contact with the bristles of the brush seal at the toroidal area of the brush seal and having a cylindrical shape to fit closely a shape of the toroidal area of the brush seal.

5. The method according to claim 1, wherein the bearing cover is fixed to the retaining ring by welding or crimping.

6. The method according to claim 1, wherein a portion of the retaining ring abuts a first side of the bristles, and a portion of the bearing cover abuts a second side of the bristles.

7. An assembly forming a gasket for a turbomachine, comprising:
   a brush seal made of a plurality of sealing elastic bristles surrounding a core,
   a retaining ring comprising a recess to at least partly accommodate the brush seal, and
   a bearing cover, placed in contact with the brush seal to hold the brush seal in position against the retaining ring, the brush seal being located between the retaining ring and the bearing cover,
   wherein an inner diameter of the bristles of the brush seal is machined after assembling the bearing cover on the retaining ring so as to be adapted to sealing requirements,
   wherein the assembly can be assembled and disassembled on the turbomachine, and
   wherein the retaining ring comprises a fixing leg for fixing the retaining ring to a support element of a turbomachine stator part, the fixing leg forming a substantially linear extension of the retaining ring from a portion of the retaining ring in contact with the brush seal, a free end of the fixing leg being above an upper end of the bearing cover.

8. The assembly forming a gasket according to claim 7, wherein the recess of the retaining ring has a cylindrical shape to fit closely a shape of a toroidal area of the brush seal, at least partly accommodated in the recess, and to hold the brush seal in position.

9. The assembly forming a gasket according to claim 7, wherein the bearing cover comprises a first planar bearing portion, placed in contact with the bristles of the brush seal outside a toroidal area of the brush seal.

10. The assembly forming a gasket according to claim 7, wherein the bearing cover comprises a second bearing portion, placed in contact with the bristles of the brush seal at a toroidal area of the brush seal and having a cylindrical shape to fit closely a shape of the toroidal area of the brush seal.

11. The assembly forming a gasket according to claim 7, wherein the bearing cover is fixed to the retaining ring by welding or crimping.

12. The assembly forming a gasket according to claim 7, wherein a portion of the retaining ring abuts a first side of the bristles, and a portion of the bearing cover abuts a second side of the bristles.

13. An assembly forming a gasket for a turbomachine, comprising:
   a brush seal made of a plurality of sealing elastic bristles surrounding a core,
   a retaining ring comprising a recess to at least partly accommodate the brush seal, and a fixing leg extending linearly from a portion of the retaining ring in contact with the brush seal in an opposite direction of the bristles of the brush seal, and
   a bearing cover, placed in contact with the brush seal to hold the brush seal in position against the retaining ring, the brush seal being located between the retaining ring and the bearing cover,
   wherein the brush seal is free of plastic deformation when being held in position against the retaining ring by the bearing cover,
   wherein a rigidity of the retaining ring is higher than a rigidity of the brush seal,
   wherein an inner diameter of the bristles of the brush seal is machined after assembling the bearing cover on the retaining ring so as to be adapted to sealing requirements,
   wherein the assembly can be assembled and disassembled on the turbomachine, and
   wherein the retaining ring comprises a fixing leg for fixing the retaining ring to a support element of a turbomachine stator part, the fixing leg forming a substantially linear extension of the retaining ring from a portion of the retaining ring in contact with the brush seal, a free end of the fixing leg being above an upper end of the bearing cover.

14. A turbomachine stator part, comprising:
   an assembly forming a gasket according to claim 7, and
   a support element on which the retaining ring of the assembly forming a gasket is fixed.

15. The turbomachine stator part according to claim 14, further comprising an elastic return member placed between the support element and the bearing cover of the assembly forming a gasket to intensify contact between the bristles of the brush seal and the retaining ring.

16. A turbomachine comprising an assembly forming a gasket according to claim 7.

17. A turbomachine comprising a turbomachine stator part according to claim 14.

18. A method for assembling an assembly forming a gasket according to claim 7 on a turbomachine stator part, comprising the only step of fixing the retaining ring of the assembly forming a gasket to a support element of the stator part.

* * * * *